(12) United States Patent
Thorpe et al.

(10) Patent No.: US 6,712,184 B2
(45) Date of Patent: Mar. 30, 2004

(54) METHOD AND APPARATUS FOR MOUNTING A BRAKE DISC

(75) Inventors: William Anthony Thorpe, Burbage (GB); Adam Challenor, Burntwood (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/995,935

(22) Filed: Nov. 28, 2001

(65) Prior Publication Data

US 2002/0066625 A1 Jun. 6, 2002

(30) Foreign Application Priority Data

Dec. 1, 2000 (GB) .............................................. 0029445

(51) Int. Cl.⁷ .............................................. B61H 13/36
(52) U.S. Cl. ................................ 188/218 XL; 188/73.2; 188/73.38
(58) Field of Search .................... 188/71.5, 218 XL, 188/73.2, 73.38, 73.1, 73.36, 73.37; 192/207, 210.1, 200, 70.19

(56) References Cited

U.S. PATENT DOCUMENTS 2,737,033 A * 3/1956 Bendall ........................ 464/75
2,764,261 A * 9/1956 Bridges .................... 188/73.38

(List continued on next page.)

FOREIGN PATENT DOCUMENTS

| GB | 1139699 | 1/1969 |
|---|---|---|
| GB | 1350350 | 4/1974 |
| GB | 2 150 263 A | 6/1985 |
| GB | 2340564 | 2/2000 |
| GB | 2361969 | 11/2001 |
| GB | 2361973 | 11/2001 |
| WO | 98/25804 | 6/1998 |
| WO | WO 98/26192 | 6/1998 |
| WO | 98/26192 | 6/1998 |
| WO | WO 00/09903 | 2/2000 |
| WO | WO 00/66908 | 11/2000 |
| WO | WO 01/86167 | 11/2001 |

*Primary Examiner*—Matthew C. Graham
*Assistant Examiner*—Benjamin A Pezzlo
(74) *Attorney, Agent, or Firm*—Howard & Howard

(57) ABSTRACT

A disc brake (3) of the kind comprising an axially fixed hub (2) and at least one slidable brake disc (4, 6) comprises resilient means (10) acting between the disc (4, 6) and the hub (2) to control certain aspects of the movement of the brake disc (4, 6) during use. The resilient means (10), is of a leaf spring format, acting between the disc (12, 14) and the hub to control the disc dynamics is mounted on the disc (4, 6). This leads to advantages in terms of spring structure and cost and independence of the resilient bias with respect to disc position and disc (12, 14) relationship to another disc (if present) and with respect to simplicity of mounting and avoidance of dirt entrapment. The mounting of the resilient means comprising clipping the resilient means over a drive key (12) of the disc (4, 6) though an aperture (23) defined within the resilient means (10) and having associated stiffening elements or strips (26a, 26b). The resilient means (10) accordingly being securely and captively attached and located relative to the disc (4, 6) and the resilient means (10) providing a resilient bias force directed through the drive key (12).

20 Claims, 3 Drawing Sheets

U.S. PATENT DOCUMENTS

| | | | | |
|---|---|---|---|---|
| 2,926,760 A | * | 3/1960 | Lucien | 188/218 XL |
| 3,233,704 A | * | 2/1966 | Strain et al. | 188/73.1 |
| 3,739,883 A | * | 6/1973 | Marin | 188/71.1 |
| 3,754,624 A | * | 8/1973 | Eldred | 188/71.5 |
| 3,983,974 A | * | 10/1976 | Dowell et al. | 188/264 AA |
| 4,256,209 A | * | 3/1981 | Lupertz | 188/218 XL |
| 4,257,510 A | * | 3/1981 | Fisher | 192/207 |
| 4,280,597 A | * | 7/1981 | Schorwerth | 188/218 XL |
| 4,479,569 A | * | 10/1984 | Kummer et al. | 192/70.2 |
| 4,511,021 A | * | 4/1985 | Grider | 188/218 XL |
| 4,576,255 A | * | 3/1986 | Mery et al. | 188/71.5 |
| 4,585,096 A | * | 4/1986 | Bok | 188/73.37 |
| 4,865,160 A | | 9/1989 | Casey | |
| 5,005,676 A | * | 4/1991 | Gassiat | 188/218 XL |
| 5,383,538 A | * | 1/1995 | Bair et al. | 188/218 R |
| 6,035,978 A | * | 3/2000 | Metzen et al. | 188/218 XL |
| 6,247,560 B1 | * | 6/2001 | Bunker | 188/18 A |
| 6,305,510 B1 | * | 10/2001 | Bunker | 188/218 XL |
| 6,457,567 B1 | * | 10/2002 | Bunker | 188/18 A |

* cited by examiner

METHOD AND APPARATUS FOR MOUNTING A BRAKE DISC

This invention relates to a method and apparatus for mounting a brake disc in a disc brake. A particular application of the invention is to a spot-type automotive disc brake in which at least one, and preferably two brake discs are mounted for axial movement in use with respect to a central drive hub which drives the discs and on which they exert a braking effect during use. Typically, the central drive hub is a wheel mounting of an automobile. Certain aspects of the invention may find application outside the confines of spot-type automotive disc brakes. We have established that spot-type single or multi-disc disc brakes of the kind comprising axially moveable discs can provide significant advantages over conventional spot-type automotive disc brakes. These advantages are set out in a series of patent applications which we have filed covering various aspects of the constructional differences between such brakes and conventional automotive disc brakes.

One aspect of these constructional differences relates to the use of resilient means acting between the one or more brake discs and the rotatable mounting therefor. Such resilient means are provided to control certain aspects of the dynamics or movement of the brake discs during use. Reference is made to the disclosure in WO 98/26192 (docket 2558) for a representative prior disclosure in this regard, and likewise to WO 98/25804 (docket 2561). This latter disclosure concerns a disc brake system in which a plurality of leaf springs mounted on a hub and engaging the brake disc apply radially-directed forces between the disc and the hub.

However, we have discovered that the mode of mounting the resilient means with respect to the drive hub is of significance in relation to the effective operation of the resilient means for the brake as a whole, not to mention the resilient function itself.

As a matter of simple design principles, it is to be expected that the optimum arrangement would be as disclosed in our above-identified prior applications, in which the resilient means is mounted on the hub and exerts its resilient or biasing effect on the disc by virtue of limited contact with the disc at certain well defined locations depending on the exact resilient means (or spring) design and the spring location.

Such an approach is consistent with the design principles emerging from the basic structure of the disc brake in which the relatively massive central hub provides a convenient reference base not only structurally for the mounting of the biasing springs, but also a relatively massive heat sink whereby a substantial thermal gradient exists in use between the brake disc with its locally-generated thermal energy and relatively low thermal capacity, whereby thermal factors favour minimising the numbers of components to be subjected to frequent substantial thermal gradients, particularly components such as springs which are reliant upon thermally sensitive physical properties such as resilience.

However, we have discovered that despite the fact that the obviously apparent factors favour the adoption of the disc-mounting principles (with respect to resilient bias) disclosed in the prior art, there are significant and unexpected compensatory advantages in adopting the reverse approach wherein it is the disc itself which provides a mounting base for the resilient means (for example a series of circumferentially-spaced springs), whereby these can be considered as exerting a resilient bias which is directed from their mounting base on the disc to the rotatable disc-mounting hub, contrary to the teachings of the prior art.

Our prior co-pending UK Patent application number GB0010810.0 describes an arrangement in which resilient means are mounted upon the brake discs. The various arrangements and mounting of the resilient means to the disc described in this prior patent offer a considerable improvement over other prior arrangements in which the resilient means are mounted on the hub or (as in DE 20 39 003) lodged between the hub and the disc. However the arrangements disclosed can be further improved, in particular in terms of security of mounting the resilient means to the disc, cost, simplicity of the arrangement and ease of assembly and fitting to the disc, as well as allowing easier assembly of the complete brake unit and fitting of the disc to the hub.

According to the invention there is provided a method and apparatus as defined in the accompanying claims.

In embodiments of the invention there are provided resilient means adapted to be mounted on the axially-slidable brake disc in various ways and in various formats providing individual variations in ease of construction and mounting.

In an embodiment the individual resilient means straddle a series of projecting drive keys of the brake disc which are constructed to slidably cooperate with a series of complementary keyways formed in the rotatable mounting hub for the brake disc. The resilient means are arranged to clip over the drive keys of the disc such that the resilient means are securely attached to the disc. In particular the distal end of the protecting drive keys comprises an enlarged foot portion which is wider than the main disc thickness. The resilient means include an aperture portion which is adapted to allow the resilient means to be fitted over the drive key whilst the resilient means is then, once fitted retained radially on the drive key.

Specifically the aperture is generally dimension to be slightly smaller than the width of the wider end portion of the drive key. The resilient means is installed one side at a time with the resilient means being angled such that the resilient means can be fitted over the wider end portion of the drive key. Once fitted, radial movement inwards of the resilient means is then restricted by the difference in size between the aperture and the wider end portion of the drive key. In other words the resilient means is held in place by abutment against the wider end portion of the drive key.

Preferably the resilient means comprises a leaf spring type format which is originally formed from sheet material. In particular the leaf spring comprises a central generally planar main body portion within which the aperture is defined. A pair of depending arcuate arms extend and curve away from the central portion, such that when fitted the tips of the arms are disposed radially inwards of the main body portion mounted on the drive key with the tips abutting and running on the outer peripheral surface of the hub. The curvature of the arms and their resilience arranged to provide a resilient bias force between the disc and hub in use. Such a leaf spring is relatively simple and cheap to produce, especially when compared to wire spring format resilient means. Furthermore the arcuate nature of the arms permits an increased clearance between the resilient means/disc and hub to be used with reduces problems that can occur in practical use with debris becoming entrained within a smaller clearance.

The mounting of the resilient means on the drive keys, and the symmetrical nature of the resilient means comprising arms which extend from a central main body portion, also means that the line of action of the resilient bias force is directed through the centre of the drive keys. This is particular advantageous since it is the drive keys that locate the disc on the hub and by directing the resilient bias force through the disc to the hub mounting potential problems with binding of the drive keys within the hub keyways and so jamming of the required axial sliding of the disc on the hub are reduced. In other words the resilient means, by virtue of being located on the drive keys mounting the disc to the hub, more directly maintain the drive keys in the correct position within the keyways allowing the disc to freely axially slide as required.

The resilient means also preferably includes locating and load tab features located around the periphery of the aperture. These tabs are arranged and adapted such that when the resilient means is fitted to the disc key the tabs abut and press against the exterior surfaces of the drive key to locate the resilient means. In effect the tabs pinch against the drive key to thereby, at least in part, further secure, stabilise and locate the resilient means on the disc key and disc.

It emerges from the above that the present invention, or at least one broad aspect of it, is concerned with arrangements in which the disc-mounting springs of a sliding disc spot-type automotive disk brake are located with respect to the keys (which slide in corresponding keyways in an associated mounting hub) of the brake disc, and in fact are located on such keys, for example by straddling or fitting over same by virtue of a location or receptor aperture provided in the springs or resilient means. Such an arrangement has numerous advantages including the ability to supply the discs as an assembly with the associated springs suitably located on the keys and in one embodiment captive upon the keys by virtue of the enlarged foot provided on each key, and effectively ready for assembly on the corresponding mounting hub. Such an arrangement has other advantages mentioned above including operational characteristics favourable to the free-sliding movement of the disc or discs on the hub under the dynamic conditions of use and in this connection the following needs to be made clear. The resilient mounting of the disc or discs in relation to its hub is not provided (at least not primarily) for the purpose of minimising or avoiding rattling during use, but with a view to controlling the attitude of the disc or discs under the dynamics of automotive use. In other words, the resilient means serves to hold the disc or discs in its or their required attitude with respect to the rotation axis and in a plane substantially at right angles to that axis and likewise parallel to the plane of the corresponding surfaces of the brake friction elements. This aspect of the resilient function of the brake disc and friction element mounting systems is of such significance that the following four paragraphs deal with the details of that aspect of the disc brake in corresponding detail.

In the embodiments of the present invention the disc brake incorporates resilient means both in relation to the mounting of the brake discs on their mounting hub and in relation to the mounting of the brake friction elements or pads in relation to their fixed mounting or caliper.

The resilient means are of a structure and strength chosen to be capable of, both in the case of the brake discs and in the case of the brake friction elements, maintaining these components of the brake assembly in their required working attitudes with respect to the structures on which they are mounted. In other words, the springs or resilient means for the brake discs are constructed so as to hold the brake discs in non-tilted working attitudes as they rotate. Likewise, the resilient means for the friction elements or pads maintain these latter structures in their required attitudes with respect to their fixed mounting or caliper. In both cases, the resilient nature of the resilient means permits, under the dynamic conditions arising during use of the vehicle and due to engine vibration and vehicle motion/road surface induced vibration and similar factors, a degree of movement from the defined working position (as opposed to the linear axial sliding movement needed to effect friction element-to-disc engagement and disengagement when commencing and terminating braking) which is needed under normal conditions of vehicle use.

In this regard, it is to be noted that the resilient means or springs used in the embodiments in relation to the friction elements for maintaining same in their normal untilted attitudes, differ significantly from the springs disclosed in WO 98/25804 (docket 2561) and WO 98/26192 (docket 2558) in which the pad springs are mere anti-rattle springs not adapted to hold the brake pads against tilting movements, but merely to avoid rattling. Moreover, in the embodiments of the present invention the springs for the discs and for the pads are balanced in terms of their relative loading applied to the discs and the pads in order to achieve the necessary separation of same when braking is discontinued and yet holding the pads and discs against tilting during use. Thus, the spring forces exerted on the pads or friction elements of the present invention are much stronger than those needed merely to prevent rattling or noise suppression. The spring forces are sufficient to restrain the slidable brake pads or friction elements from moving into contact with the brake discs in an uncontrolled manner. The use of the substantially stronger pad springs in the present embodiments assists in positioning the outer rims of the brake discs in their brake-off position for reducing residual brake torque.

We have discovered that, contrary to the teaching in the above-identified WO specifications in which it is suggested that anti-tilt mounted discs are sufficient in themselves so far as disc/pad alignment is concerned, and all that is required for the pads is the provision of anti-rattle springs, further provision is desirable to reduce residual brake torque. We have now established that a significant reduction in residual torque can be achieved by the adoption of anti-tilt spring means for the friction elements. This feature preferably comprises the combination of resilient means in co-operation with face-to-face complementary attitude-defining surfaces on the friction elements and their guide means, and the arrangement being such that there is a co-operative effect with the anti-tilt mounted brake discs or discs such that the effect of dynamic factors arising during use including engine-and road-induced vibrations leading to micro-scale interactions of the discs and friction elements after brake application produces a relatively well-defined backing-off of the pairs of axially-moveable structures (discs and friction elements) leading to well-defined clearance positions allowing relatively low level residual torque in which the haphazard torque-producing interactions characteristic of the relatively less well-defined friction element positions of the arrangement in the above-identified WO specifications are minimised or avoided.

Thus it is now clear that the disc mounting springs are of a constructions such as to be capable of applying the substantial disc anti-tilt forces needed during use.

We have discovered that the provision of a leaf-type spring capable of applying such forces and adapted to straddle or be located on and to receive in a receptor the key of a slidable brake disc represents a substantial design challenge. Factors entering into the design parameters for such a spring include the following. Firstly, it has to be capable of applying a symmetrical load to the disc as is straddles its disc key. Secondly, as a leaf spring, it is substantially weakened by the provision in a central region of its structure of a substantial aperture or opening to receive the disc key. Thirdly, this latter factor can not be offset by widening the leaf spring in order to enable it to offer a reasonably uniform springing material cross section throughout its length since such would interfere with adjacent structures, notably the brake friction elements or an adjacent brake disc or related structure.

With these factors in mind, we have discovered that a leaf-type resilient mounting means for a slidable brake disc of the kind concerned can be provided by adopting a leaf spring structure in which there are differential levels of resilience within the spring, for example a central or intermediate region of relatively low resilience, and opposite end regions on each side of the central region which provide the desired symmetrical resilience characteristics.

Likewise, another aspect of the invention which contributes to the solution of one or more of the technical requirements identified above is a leaf spring structure for a disc brake of the kind concerned, in which the leaf spring is mounted on or straddles a drive key of the brake disc and comprises resilient gripping or engagement means to engage or grip the opposite side faces of the key. Yet another aspect of the invention which contributes likewise to the provision of resilient means more nearly meeting the above-identified requirements than prior proposals is an arrangement in which the resilient means comprises leaf spring means in which resilient end portions are separated by an intermediate portion defining a mounting opening adapted to receive a mounting member such as a disc key, the mounting opening being defined at least in part by spring portions disposed in a non-coplanar relationship to the resilient spring end portions.

In the described embodiments these features contribute to a structure having rather unusual operating characteristics for a leaf spring. Generally, leaf springs are mounted by clamping or by relatively small mounting screws or bolts so that the resilient nature and strength of the spring is not compromised. In the described embodiments of the present invention the leaf spring is mounted or located by means of a very substantial central opening which nevertheless does not deprive the spring of its substantial strength needed to provide the required disc control and anti-tilt functions. Thee functions are provided mainly by the resilient end portions of the spring which are interconnected by the central or intermediate portion (defining the central opening), which central portion is provided by a pair of upstanding rails or plates, integral with the remainder of the spring, and providing (by virtue of their attitude) a very substantial level of stiffness, and yet serving to hold the inner ends of the outer (and resilient) end portions of the leaf spring at the required attitude for the desired spring function. In this latter regard (meaning holding the inner end portions of the resilient end portions of the leaf spring at their required attitudes), the following comment is believed relevant. In alternative leaf spring arrangements which the present applicants have considered, it is relatively easy to provide a leaf spring which is simply lodged at one side of a relevant one of the brake disc keys so as to exert its resilient effect. Such a leaf spring can be provided with resilient tabs to grip the disc on opposite sides for location purposes. However, such a spring can not readily be provided with a high spring rate since it only lodges against one side of its disc key and the spring force which it generates is inevitably merely that which results from the compression of the spring from its lodged to its mounted position. Because the spring when thus-lodged is inevitably at an attitude determined by its own inherent tendency to adopt a minimum energy attitude prior to mounting, the level of spring force generated is comparatively low. In the embodiment of the present invention, because the leaf spring is effectively double-ended and the central mounting portion of the spring serves to hold each resilient end portion in its required attitude relative to each other, the overall spring construction and profile can be chosen so that the spring force generated on mounting the disc on its hub is very substantial, as required. The embodiments of the invention achieve this while the spring is able to straddle the disc key in a surprising way which arises from the structure of the spring in which the central mounting portion is relatively stiff and strong and yet occupies an absolute minimum of lateral space, due to the generally upstanding or upwardly-inclined or vertical attitudes of the side plates or rails defining the central opening), and the corresponding resilient end portions interconnected thereby. The attitude relationship between the intermediate and end portions of the leaf spring contributes to its particular adaptation for the technical requirements identified above since the intermediate portion is required not only to hold the resilient end portions appropriately, but also the intermediate portion occupies an absolute minimum of lateral space. Additionally the opening in the intermediate or central portion of the spring can be relatively large in order to accommodate, for example, a correspondingly relatively large disc key and which may be provided with an enlarged end or foot portion for stable cooperation with the mounting hub of the brake assembly. The provision of such an enlarged foot or end portion of the brake disc key for sliding engagement with the hub of the brake assembly contributes significantly to the operational stability and anti-tilt operating characteristics of the brake disc in use. To put it another way, the particular construction of the leaf spring described embodiments of the invention enables them not only to fulfill some or all of the above-identified requirements of such a spring, but also to provide in combination with these functions a contribution to the overall stability and functional integrity of the brake by contributing in another way to the maintenance of the required disc operating attitude, and to do so in an automotive disc brake intended for the mass market which has hitherto exclusively been served by disc brakes of the kind in which the brake disc is rigidly mounted on its rotatable mounting hub.

Another aspect of the structure of the described embodiments of the resilient brake disc mounting means concerns the provision of tab means to cooperate at the intermediate portion of the resilient means with the brake disc key as it projects through the opening in the resilient means and to cooperate not only with opposite sides of the key, but also with opposite (circumferentially spaced) ends of the key. The tab means or resilient engagement means serve in this way to maintain the leaf spring at precisely the required and designed position in relation to the brake disc key required for optimum performance characteristics in terms of application of spring forces to the brake disc at the required location, in a balanced manner at all the circumferentially-spaced positions at which brake disc keys are provided around the inner periphery of the brake disc.

Turning now to the structure of the resilient end portions of the leaf spring or resilient means, it will be noted from the drawings that these taper outwardly towards the ends at which contact with the mounting hub is made. Moreover, these end potions have a generally curved profile (in their relaxed state) whereby the required spring characteristics are obtained in a cost effective manner and without the need to resort to a heavy duty spring for this particular duty function.

The tapering format and curved profile contribute to spring characteristics which meet the demanding requirements discussed above.

In an embodiment of the invention there is provided stiffening means extending lengthwise of the leaf spring structure and adapted to offset the structural effect of the opening formed in the leaf spring.

In a preferred embodiment of the invention the stiffening means is provided by at least one integral portion of the leaf spring structure which is adapted to provide the stiffening function, for example by being bent or otherwise formed so as to lie in a plane or planes out of the corresponding plane or general contour or alignment of the adjoining part of the leaf spring.

In one embodiment side portions of the leaf spring are folded upwards. In another envisaged embodiment an internal portion or two symmetrical aligned internal portions are upturned for this purpose. It is envisaged that such portions might simultaneously also serve to define and produce the internal opening formed in the spring structure. It is envisaged that in certain circumstances alternative stiffening arrangements might be adopted on the basis, for example, of a fabricated structure if such were needed or desirable for particular circumstances.

Embodiments of the invention will now be described by way of example with reference to the accompanying drawings in which.

Figure 1:
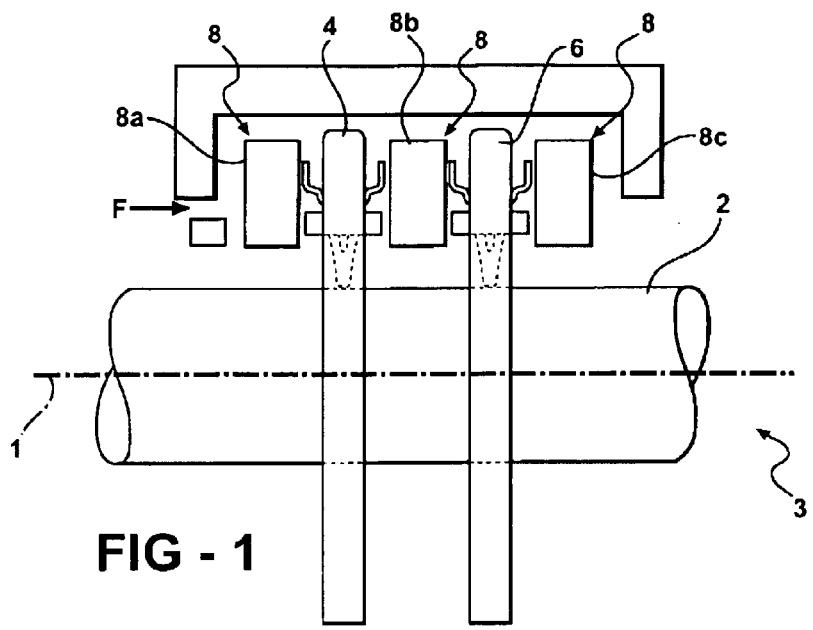
FIG. 1 shows a diagrammatic schematic representation of the twin slidable brake disc braking system of a spot-type disc brake having a pair of axially slidable brake discs.

As shown in FIG. 1 a spot-type automotive disc brake 3 comprises a pair of rotatable brake discs 4, 6, a rotatable mounting or hub 2 for the discs 4, 6 to permit such rotation about axis 1 and which is adapted to drive the brake discs 4, 6 and to have exerted thereon a braking effect by the brake discs 4, 6 when disc brake 3 is actuated. As shown the pair of brake discs 4, 6 are coaxially arranged parallel to each other to rotate about the common hub 2 and hub axis 1.

Friction elements shown generally at 8 are located adjacent to the axial faces of the brake discs 4, 6,. The friction elements 8 are mounted such that they are movable in an axial direction, but are restrained from rotating about the hub 2 and hub axis 1. As shown there are three sets of friction elements 8, with a common friction element 8 located between the brake discs 4, 6. The friction elements 8 are adapted to frictionally engage braking surfaces on opposite axial sides of brake discs 4, 6 to effect braking upon actuation of actuation means (not shown) which apply an axial load F on the friction elements 8 to press the friction elements 8 against the axial faces of the brake discs 4, 6. Suitable actuation means and mounting arrangements for the friction elements 8 are disclosed in the above identified WO 98/26192 and WO 025804 specifications.

Both of the brake discs 4, 6 are axially slidable in use with respect to mounting hub 2. Under the action of the actuation means during braking the friction elements 8 are urged axially against the brake discs 4, 6 causing and urging the brake discs 4, 6 to slide axially together. In this way the central friction element 8b is sandwiched between the brake discs 4, 6 under braking and the axial braking actuation load F applied via the actuation means. As a result, and due to the resultant frictional engagement of the friction elements 8 with the axial side faces of the brake discs 4, 6, rotation of the brake discs 4, 6 and so of the hub 2 is braked.

One of the friction elements 8a is fixed axially on a fixed caliper structure 9 with the other two axial sets 8b, 8c being slidable. It is mentioned that further brake discs 4, 6 and sets of friction elements 8 could in principle be added to improve braking effectiveness, although the use of twin discs 4, 6 is preferred in terms of cost, complexity and braking efficacy.

It is to be understood that the purely diagrammatic representation shown in FIG. 1 is intended to be simply a convenient reference base, for purposes of description of the detailed structures shown and described in the remaining figures.

The brake discs 4, 6 are slidably mounted on hub 2 via inwardly projecting drive keys or teeth or dogs 12 which extend from an inner periphery of the brake discs 4, 6, and which constitute locating elements for a series of leaf springs, as disclosed below. Preferably there are a number of such keys 12, for example three or four, equispaced about the circumference of the inner periphery of the brake disc 4, 6. These drive keys 12 and the mounting and locating of the disc 4, 6 to the hub 2 is generally similar and as such only one such drive key and related assembly is shown and described in FIGS. 2 to 6b.

The disc 4, 6 is mounted on hub 2 by means of the series of inwardly projecting keys or drive formations 12 which are of a radially inwardly tapering format and which enter correspondingly-profiled keyways 20 or grooves formed in the hub 2 and extending generally axially of the hub 2. Accordingly the brake discs 4, 6 can slide axially with the keys 12 sliding in the hub keyways 20, whilst the brake disc 4, 6 and hub 2 are rotationally secured such that relative rotation of the brake discs 4, 6 and hub 2 is prevented by the engagement of the keys 12 in the keyways 20 formed in the hub 2.

In order to allow the discs 4, 6 to axially slide it will be appreciated that there needs to be some degree of clearance between the drive keys 12 and keyways 20. This however also means that the discs 4, 6 can move radially slightly such that they are no longer exactly coaxially mounted with respect to the hub 2 and hub axis 1. In addition the discs can tilt relative to the hub 2 and their attitude with respect to the hub 2 and hub axis 1 is no longer securely controlled and maintained. To overcome this and maintain and control the disc attitude as well as coaxial location of the disc 4, 6 to the hub and hub axis, whilst still allowing axial sliding resilient means 10 are provided within the mounting of the discs 4, 6 to the hub 2.

Resilient means 10 are provided at circumferentially spaced positions around brake discs 4, 6 and are adapted to act between the brake discs 4, 6 and the mounting therefor at said positions. The mounting of the resilient-means 10 with respect to the brake disc 4, 6, and on same, is such that the resilient means 10 slides axially with the disc 4, 6.

In the case of brakes including multiple discs, as here, it is desirable for the movement, locating and mounting of the individual discs 4, 6 to be controlled in a uniform manner with the resilient means 10 providing a uniform effect over the operating range of and during the axial movement of the discs 4, 6. By mounting the resilient means 10 on the brake discs 4, 6 this desirable feature and result is provided. The resilient means 10 provide a radially directed force which ensures that the discs 4, 6 are coaxially located with respect to the hub 2 and hub axis 1, whilst simultaneously permitting axial movement of the discs 4, 6. In addition they also assist in maintaining the plane of discs 4, 6 perpendicular to the hub 2 and hub axis 1 as the discs 4, 6 slide axially during brake actuation. This is also important in order for effective braking to be provided and for effective operation of the braking system. In other words the resilient means 10 provide a means for maintaining the disc attitude and coaxial location of the discs 4, 6 whilst also permitting axial sliding of the discs 4, 6.

The resilient means 10 which are provided at circumferentially spaced positions around the brake discs 4, 6 and which are adapted to act between the brake disc 4, 6 and the mounting for the brake disc 4, 6 at those positions apply a resilient bias directed, in a radial direction, from the mounting of the resilient means 10 on the disc 4, 6 to the rotatable mounting or hub 2 on which the disc 4, 6 is mounted at the respective circumferentially spaced positions on the brake disc or discs 4, 6. The resilient bias, or force acting between the discs 4, 6 and hub is provided and generated by virtue of the resilience of the resilient means 10 and deformation or bending of the resilient means 10. As will be understood by the person skilled in the art, deformation or bending of resilient means 10 induces stress. This induced stress in the resilient means 10 generates forces acting in the opposite direction to the deformation or bending which tend to counter the deformation or bending and so provides a resilient bias force.

It should be noted and will be appreciated by those skilled in the art that the resilient means 10 between the discs 4, 6 and hub 2 are required to provide and exert an significant force on the discs at all times. Such a significant force is required in order to provide the required disc attitude (anti-tilt) control function in view of the mass, loads and rotational velocity of the discs 4, 6 and hub 2. Consequently such resilient means can be contrasted with lighter resilient means which provide lower forces for purely anti-rattle function.

As described above the arrangement has features in common with that described in our prior copending application number GB 0010810.0 (dockets 30039 and P54615GB) which is incorporated herein by reference. The present invention though differs, and provides distinct advantages over the prior arrangements described in that related copending application in terms of the structure of the resilient means 10 and its mounting to the brake discs of the braking system.

We refer now in more detail to FIGS. 2 to 6, which show a particular embodiment of the resilient means 10 and its mounting to the discs 4, 6.

The distal end, radially innermost, of the drive keys 12 extending from the radially inner peripheral surface of discs 4, 6, includes flanges 14 which project axially fore and aft from a main body of the drive key 12. Accordingly the drive key 12 has a generally T-shaped circumferential cross section, with an axially wider distal end portion. In other words the drive key 12 has an enlarged distal end or foot at its radially innermost end.

The provision of an enlarged foot portion and flanges 14 on the drive key 12 provides additional lateral anti-tilt stability to the location of the disc 4, 6 with the flanges 14 and foot wider, in an axial direction, than the main disc 4, 6 thickness and the flanges 14 extending axially beyond the plane of the disc 4, 6 axial faces. This enhances the stability of the mounting of the discs 4, 6 on the hub 2.

The provision of a wider enlarged foot on the drive keys 12 of a slideable brake disc is an independent aspect of the inventive material disclosed herein. For present purposes it suffices to says that there is provided in accordance with this aspect of the invention a disc brake of the axially sliding disc kind, and a brake disc therefor, in which a foot or end portion on at least one drive key of the disc has an enlarged end portion for sliding engagement with an associated hub or mounting.

The resilient means 10 is of a leaf spring type format comprising a sheet of spring material, for example spring steel, which is preformed and bent to the required shape and profile to provide a resilient spring member 30. Such leaf springs which may be formed by stamping/pressing and bending from sheet material are significantly cheaper and simpler to produce than wire springs. An individual spring member 30, forming the resilient means 10, is shown in more detail, alone, in FIGS. 4 and 5. The individual spring members 30 are fitted onto the drive keys 12 of the discs 4, 6 to provide a resilient means 10 between the discs 4, 6 and hub 2 and provide the required resilient bias radial force.

As shown the spring member 30 comprises a central main or intermediate body portion 25. A central receptor aperture 23 of a generally rectangular shape is defined within the centre of the central main body portion 25. Rail flanges 26a, 26b, shown here as strips or flanges along each lateral side of the central main body portion 25, extend and project from the main body portion 25. These rail members constitute stiffening means for the central portion 25 of the spring member 30. Additional depressions and formations 21 may also be formed within the central main portion 25 to also stiffen the main body portion 25. Such stiffening of the central or intermediate portion enhances the resilience of end portions in the form of arm members 28a, 28b (described below), and so of the spring member 30 as a whole, by providing a rigid or stiffened portion of the spring member 30 against which the arms 28a, 28b can act.

On each lateral side of the aperture 23 there are a pair of lateral support tabs 24a, 24b which depend from the central main body 25, and in this case from the respective rail members 26a, 26b. These extend at an angle with respect to the central main body portion 25 and are angled laterally inwards towards the centre of the aperture 23. As a result when the spring member 30 is fitted to the disc 4, 6 the lateral locating tabs 24a, 24b, bear against the opposite axial faces of the drive key 12 and pinch the drive keys 12 and disc 4, 6 to locate the spring member 30 on the disc 4, 6. Load bearing tabs 22a, 22b also depend from the central main body 25 at each end of the aperture 23. These are also angled slightly inwards towards the centre of the aperture 23 closing off to some degree the lower side of the aperture 23. The load bearing tabs 22a, 22b bear against and abut the circumferential tapered faces of the drive key 12 and restrict the radial outward movement of the spring member 30 relative to the disc 4, 6. The angling of the load bearing tabs 22a, 22b is arranged to correspond to, and cooperate with, the tapered angle of the drive and locating element or key 12.

Figure 6A:
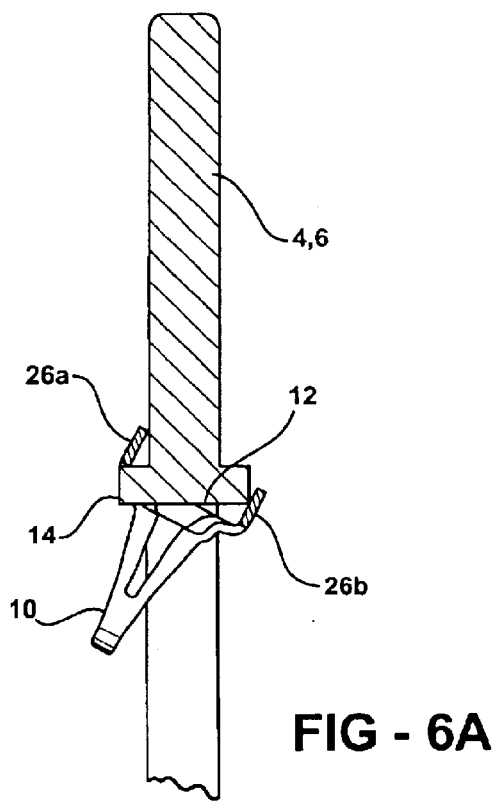
FIG. 6a and 6b show illustrative axial cross sectional views through the brake disc showing the fitting of the resilient means to the brake disc.
Figure 6B:
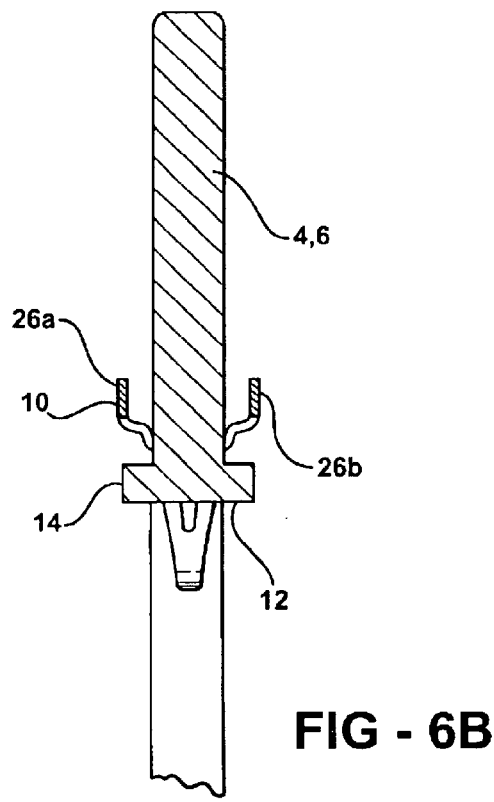
Figure 2:
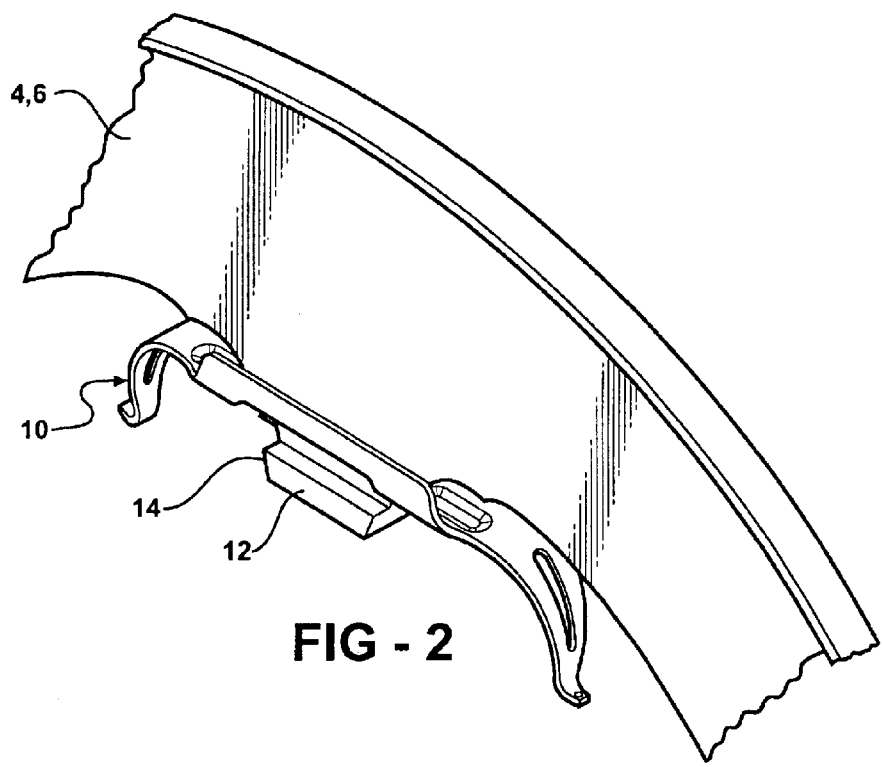
FIG. 2 shows a perspective view of a portion of a brake disc with an associated resilient means in accordance with the invention fitted.

The shape and dimensions of the aperture 23 correspond to the drive keys or locating elements 12 such that when the spring member 30 is fitted to the disc 4, 6 the drive key 12 can be inserted though through the aperture 23. The lateral dimension of the aperture 23 is though smaller than that of the foot and flange 14 of the drive key 12. To fit the spring member 30 to the drive key 12 the spring member 30 is tilted and one lateral side is first fitted over one side of the drive key 12 and flange 14 as shown in FIG. 6a. Once one side has been fitted and clipped over the drive key 12 and flange 14, onto the thinner main portion of the drive key 12, the spring member 30 is tilted back and the other side of the spring member 30 is fitted over the other side of the drive key 12 and flange 14, as shown in FIG. 6b. The resilience of spring member 30 permits the locating tabs 24a, 24b and spring member 30 to bend and flex slightly to allow the spring member 30 to be clipped onto and over the drive key 12. In this way the spring member 30 can be clipped to the drive key 12 and disc 4, 6 and the spring member 30 is securely mounted and clipped onto the disc 4, 6. Once the spring member 30 is fitted and clipped to the drive key 12, radial movement of the spring member 30 is prevented by the flanges 14 of the drive key, size of the aperture and locating 24a, 24b and load tabs 22a, 22b and thus the spring member 30 is captive and securely attached and mounted onto the drive key 12 and disc 4, 6 without the need for separate fasteners or the incorporation of complex mounting features on the disc 4, 6 as is sometimes required in prior designs. The positioning and arrangement of the locating tabs 24a, 24b which 'pinch' also provides a stable mounting and positioning of the spring member 30 to the drive key 12 and disc 4, 6. This assists in ensuring a more constant resilient bias force which is uniform during axial sliding of the disc 4, 6 and resilient member 30 during braking.

Spring end portions in the form of arcuate arms 28a, 28b extend and project from each end of the main body portion 25 of the spring member 30. These arms 28a, 28b curve, as shown, downwards from the main body portion 25 and when assembled on the disc 4, 6 extend radially inwards towards the hub 2. The width of the arms 28a, 28b tapers from the central portion 25 to the distal ends of the arms 28a, 28b. The distal ends and tips of the arms 28a, 28b are curved in the reverse direction, as compared to the main direction of curvature of the arms 28a, 28b, to provide an arcuate curved tip portion 18a, 18b to each arm 28a, 28b. When assembled the arcuate curved tip portion 18a, 18b bears against and abuts the outer peripheral surface 16 of the hub 2 as shown with respect to the lefthand arm 18a in FIG. 3, the tip portions 18a, 18b providing smooth contact with the hub.

Figure 3:
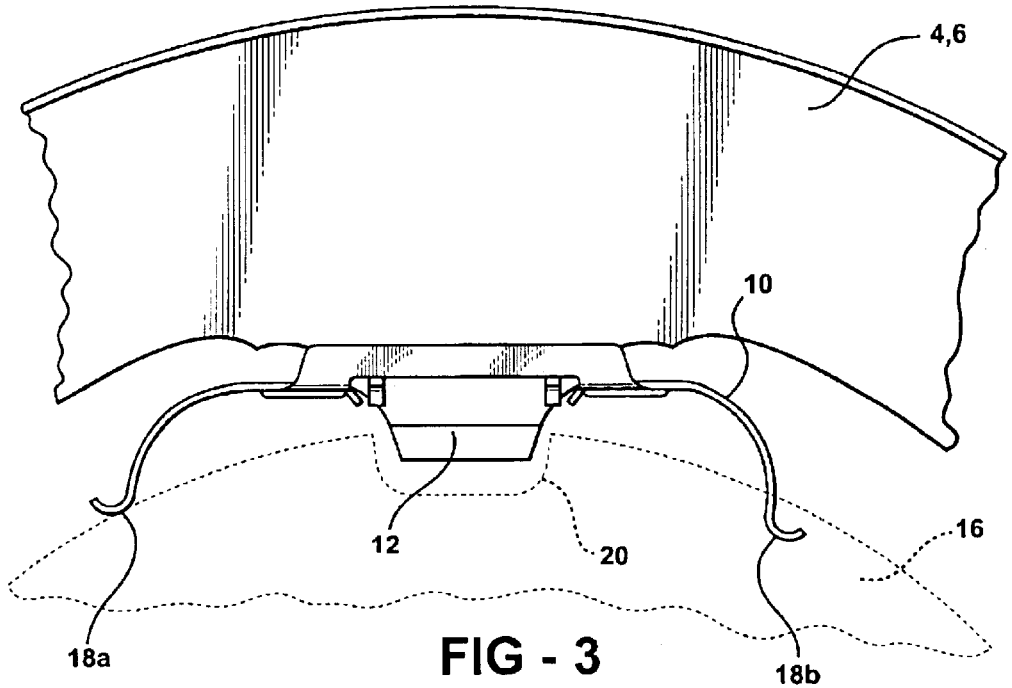
FIG. 3 shows a side view, in an axial direction, of a brake disc with an associated resilient means in accordance with the invention fitted, and also showing the position of a hub upon which the brake disc is mounted.
Figure 4:
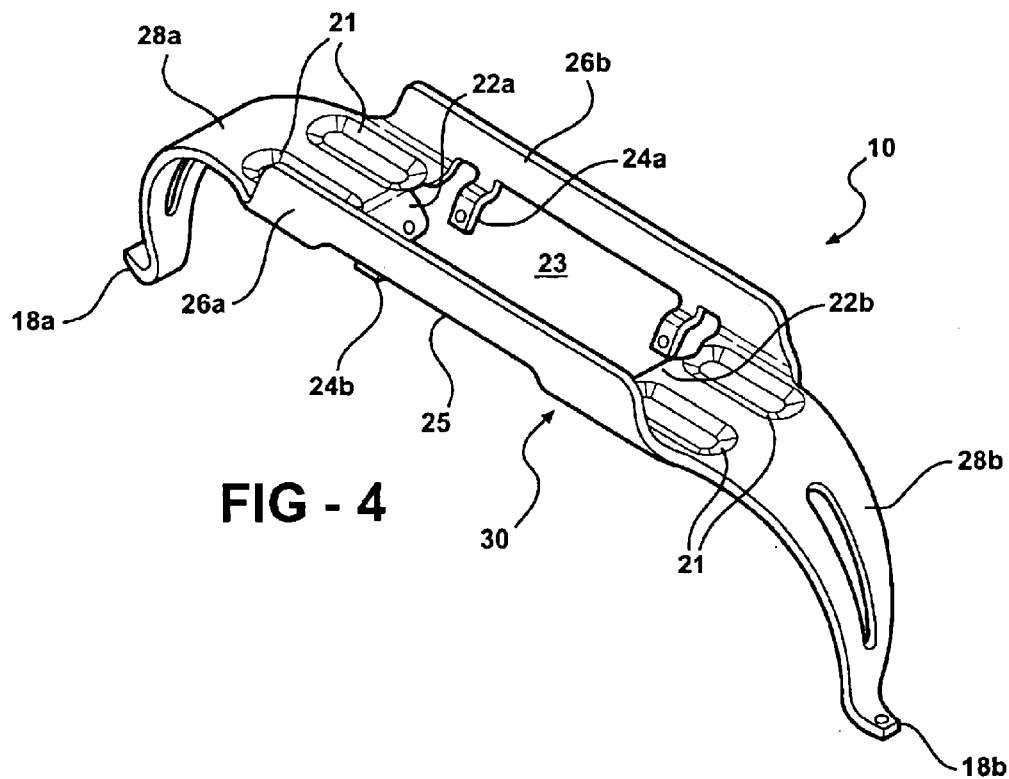
FIGS. 4 and 5 show respective perspective and side more detailed views of the resilient means shown in FIGS. 2 and 3.
Figure 5:
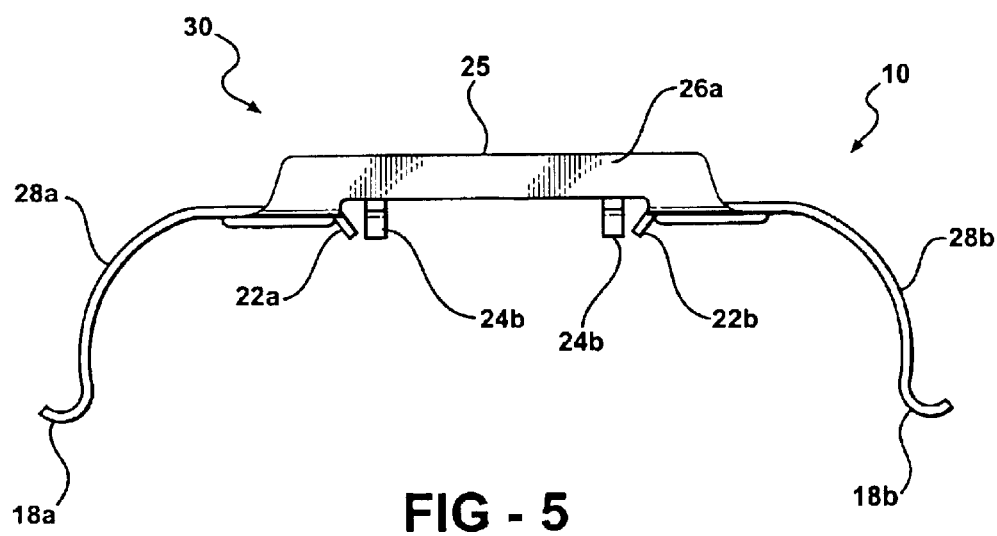

The natural position of the arcuate arms 28a, 28b, as shown with respect to the righthand arm 18b in FIG. 3, is such that the tip 18b is at a position which would be radially inside the outer circumference of the hub 2 (shown in phantom) when the spring member 30 is fitted to the disc 4, 6. Consequently when assembled and the disc 4, 6 fitted to the hub 2 the arcuate arms 28a, 28b are flexed radially outwards. As a result the arms 28a, 28b provide the required resilient radial bias force between the hub 2 and disc 4, 6, with the arcuate curved tip portions 18a, 18b pressing against the outer peripheral surface 16 of the hub 2 and the load tabs 22a, 22b pressing against the drive key and so disc 4, 6.

It will be appreciated that the different positions of the left and right hand arms are shown in FIG. 3 for illustrative purposes, and that usually both arms would adopt the same or similar positions.

Due to the symmetrical arrangement of the spring member 30 and mounting on the drive key 12 the radial bias force generated is directed in a radial direction and acts through the drive key 12 through which the disc 4, 6 is mounted on hub 2. This is particularly advantageous. It improves the ability of the disc 4, 6 to slide freely axially relative to the hub 2 since the resilient bias force acts though the means, drive keys 12, for mounting the disc 4, 6 to the hub 2. Furthermore since the spring member 30 only contacts the disc 4, 6 at the drive key 12 positions the remainder of the inner periphery of the disc 4, 6 can be further away radially from the hub 2 so reducing weight. In addition the curved arcuate nature of the arms 28a, 28b also allows the main portion of the disc 4, 6 to be spaced further from the hub 2 so also increasing clearance there between. Such increased clearances reduces the build up and entrapment of dirt and corrosion-inducing detritus which can be problematic in other arrangements.

What is claim is:

1. A disc brake comprising spring members having opposite end portions, said spring members adapted to act between a brake disc and a hub at circumferentially-spaced positions around said brake disc, and said spring members comprising individual separate leaf springs formed with receptor apertures to receive projecting locating elements provided on and inseparable from said brake disc.

2. A spot-type disc brake, comprising:
   a) at least one rotatable brake disc having braking surfaces on opposite sides of said at least one rotatable brake disc;
   b) a hub for mounting said at least one rotatable brake disc to permit such rotation and which is adapted to drive said at least one rotatable brake disc and to have exerted thereon a braking effect by said at least one rotatable brake disc when the disc brake is actuated;
   c) at least one pair of friction elements adapted to frictionally engage said braking surfaces to effect braking;
   d) said at least one rotatable brake disc being axially slidable in use with respect to said hub under the action of said friction elements;
   e) spring members being provided on said at least one rotatable brake disc at circumferentially-spaced positions around said at least one rotatable brake disc and adapted to act between said at least one rotatable brake disc and said hub at said circumferentially-space positions;
   f) said spring members adapted to act in use between said at least one rotatable brake disc and said hub at said circumferentially-spaced positions and to be circumferentially located with respect to said at least one rotatable brake disc in at least one direction by engagement with a radially projecting locating element on and inseparable from said at least one rotatable brake disc;
   g) said spring members each being formed with a receptor opening adapted to receive said projecting locating element; and
   h) said spring members further adapted to receive correspondingly spaced individual locating elements of said at least one rotatable brake disc and opposite end portion of each said spring members adapted to engage said hub at each circumferentially-spaced side of is respective locating element and adapted to be resiliently deformed in use when said at least one rotatable brake disc is mounted on said hub.

3. A disc brake according to claim 2 or claim 1 wherein each of said spring members includes a clip for clipping onto and engaging said disc to retain said spring member on said projecting locating element.

4. A disc brake according to claim 2 or claim 1 wherein said locating element includes an enlarged foot portion with flanges extending from opposite sides of said disc, said receptor opening in each spring member being smaller than the total width of said foot portion defined by said flanges.

5. The disc brake according to claim 2 or claim 1 wherein said receptor opening is formed in an intermediate portion of said spring members between said opposite end portions thereof and extending lengthwise of said intermediate portion, and said intermediate portion comprising rail members also extending lengthwise of said intermediate portion and said rail members being adapted to offset at least partially the structural effect of providing said receptor opening in said intermediate portion of said spring members.

6. The disc brake according to claim 5 wherein said rail members comprise a flange extending lengthwise of said receptor opening in said spring members and being disposed in a non-coplanar relationship to an adjoining structure of said spring members.

7. The disc brake according to claim 6 wherein said opposite end portion of said spring members are formed in generally curved format and said intermediate portion in generally linear format so that said spring members are generally bow-shaped overall form.

8. The disc brake according to claim 6 wherein said flange is formed integrally with said spring members and having been deflected from a generally coplanar relationship therewith.

9. The disc brake according to claim 8 wherein said opposite end portions of said spring members are formed in generally curved format and said intermediate portion in generally linear format so that said spring members are generally of bow-shaped overally form when in an unbiased state.

10. A method of mounting a brake disc brake comprising providing spring members having opposite end portions, said spring members adapted to act between the brake disc and a hub therefore at circumferentially spaced positions around said brake disc and providing said spring members with receptor apertures to receive projecting locating elements provided on and inseparable from said brake disc.

11. A method of mounting a brake disc in a spot-type disc brake, the disc brake comprising:
    a) at least one rotatable disc having braking surfaces on opposite sides of said at least one brake disc;
    b) a hub for mounting said at least one rotatable brake disc to permit such rotation and which is adapted to drive said at least one rotatable brake disc and to have exerted thereon a braking effect by said at least one rotatable brake disc when the disc brake is actuated;
    c) at least one pair of friction elements adapted to frictionally engage said brake surfaces to effect braking;
    d) said at least one rotatable brake disc being axially slidable in use with respect to said hub under the action of said friction elements during braking;
    e) spring members being provided on said at least one rotatable brake disc at circumferentially-spaced positions around said at least one rotatable brake disc and adapted to act between said at least one rotatable brake disc and said hub at said circumferentially-spaced positions;
    f) said method comprising causing said spring members to act in use between said at least one rotatable brake disc and said hub at said circumferentially-spaced positions and to be circumferentially located with respect to said at least one rotatable brake disc in at least one direction by engagement with a radially projecting locating element of inseparable from at least one rotatable brake disc;
    g) providing each of said spring members with a receptor opening to receive said projecting locating element; and
    h) adapting each of said spring members to receive correspondingly spaced individual locating elements of said at least one rotatable brake disc and providing opposite end portions on each of said spring members adapted to engage said hub at each circumferentially spaced side of its respective locating element and adapted to be resiliently deformed in use when said at least one rotatable brake disc is mounted on said hub.

12. A method according to claim 11 or claim 10 further comprising forming said receptor openings in an intermediate portion of said spring members between said opposite end portions thereof and extending lengthwise of said intermediate portion and providing said intermediate portion comprising rail members also extending lengthwise of said intermediate portion and causing said rail members to offset at least partially the structural effect of providing said receptor openings in said intermediate portions of said spring members.

13. The method according to claim 12 further comprising forming said rail members having a flange extending lengthwise of said receptor openings in said spring members and being disposed in a non-coplanar relationship to an adjoining structure of said spring members.

14. The method according to claim 13 further comprising forming said flange integrally with said spring members causing said rail members to deflect from a generally coplanar relationship with said spring members.

15. The method according to claim 14 further comprising forming said opposite end portions of said spring members in generally curved format and said intermediate portion in generally linear format so that said spring members are generally of bow shaped overall form when in an unbiased state.

16. A method according to claim 11 further comprising providing each of said spring members with a clip and clipping said clip onto the disc with the spring member disposed on the projecting locating element projecting integrally from the brake disc by engaging said clip with said opposite sides of the disc.

17. A method according to claim 11 further comprising providing said locating element with an enlarged foot portion with flanges extending from opposite sides of the disc and the width of the receptor opening in the spring member being smaller than the total width of the foot portion.

18. A method according to claim 17 including tilting the spring member to fit the spring member over one flange of the foot portion and then over the other flange of the foot portion for retention by the foot portion.

19. A method of mounting a brake disc in a spot-type disc brake, the disc brake comprising:
    a) at least one rotatable brake disc having braking surfaces on opposite sides of said at least one brake disc;
    b) a hub for mounting said at least one rotatable brake disc to permit such rotation and which is adapted to drive said at least one rotatable brake disc and to have exerted thereon a braking effect by said at least one rotatable brake disc when the disc brake is actuated;
    c) at least one pair of friction elements adapted to frictionally engage said braking surfaces to effect braking;
    d) said at least one rotatable brake disc being axially slidable in use with respect to said hub under the action of said friction elements during braking;
    e) spring members being provided on said at least one rotatable brake disc at circumferentially-spaced positions around said at least one rotatable brake disc and adapted to act between said at least one rotatable brake disc and said hub at said circumferentially-spaced positions;
    f) said method comprising causing said spring members to act in use between said at least one rotatable brake disc and said hub at said circumferentially-spaced positions and to be circumferentially located with respect to said at least one rotatable brake disc in at least one direction by engagement with a radially projecting locating element of said at least one rotatable brake disc;

g) providing each of said spring members with a receptor opening to receive said projecting locating element; and h) adapting each of said members to receive corresponding spaced individual locating elements of said at least one rotatable brake disc and providing opposite end portion on each of said spring members adapted to engage said hub at each circumferentially spaced side of its respective locating element and adapted to be resiliently deformed in use when said at least one rotatable brake disc is mounted on said hub and further comprising forming said spring members with tab elements adapted to project in at least two locations around the peripheries of said receptor opening for engagement with the respective locating element of said at least one rotatable brake disc.

20. A spot-type disc brake, comprising:

a) at least one rotatable brake disc having braking surfaces on opposite sides of said at least one rotatable brake disc;

b) a hub for mounting said at least one rotatable brake disc to permit such rotation and which is adapted to drive said at least one rotatable brake disc and to have exerted thereon a braking effect by said at least one rotatable brake disc when the disc brake is actuated;

c) at least one pair of friction elements adapted to frictionally engage said braking surfaces to effect braking;

d) said at least one rotatable brake disc being axially slidable in use with respect to said hub under the action of said friction elements;

e) spring members being provided on said at least one rotatable brake disc at circumferentially-spaced positions around said at least one rotatable brake disc and adapted to act between said at least one rotatable brake disc and said hub at said circumferentially-space positions;

f) said spring members adapted to act in use between said at least one rotatable brake disc and said hub at said circumferentially-spaced positions and to be circumferentially located with respect to said at least one rotatable brake disc in at least one direction by engagement with a radially projecting locating element of said at least one rotatable brake disc;

g) said spring members each being formed with a receptor opening adapted to receive said projecting locating element; and h) said spring members further adapted to receive correspondingly spaced individual locating elements of said at least one rotatable brake disc and opposite end portions of each of said spring members adapted to engage said hub at each circumferentially-spaced side of its respective locating element and adapted to be resiliently deformed in use when said at least one rotatable brake disc is mounted on said hub and wherein spring members have tab elements adapted to project in at least two locations around the peripheries of said receptor openings for engagement with the respective locating element of said at least one rotatable disc.

\* \* \* \* \*